Nov. 18, 1952 R. A. WEST 2,618,309
MACHINE FOR TRIMMING STAMPINGS AND THE LIKE
Filed July 8, 1949 7 Sheets-Sheet 1

INVENTOR.
Russell A. West
BY
ATTORNEY

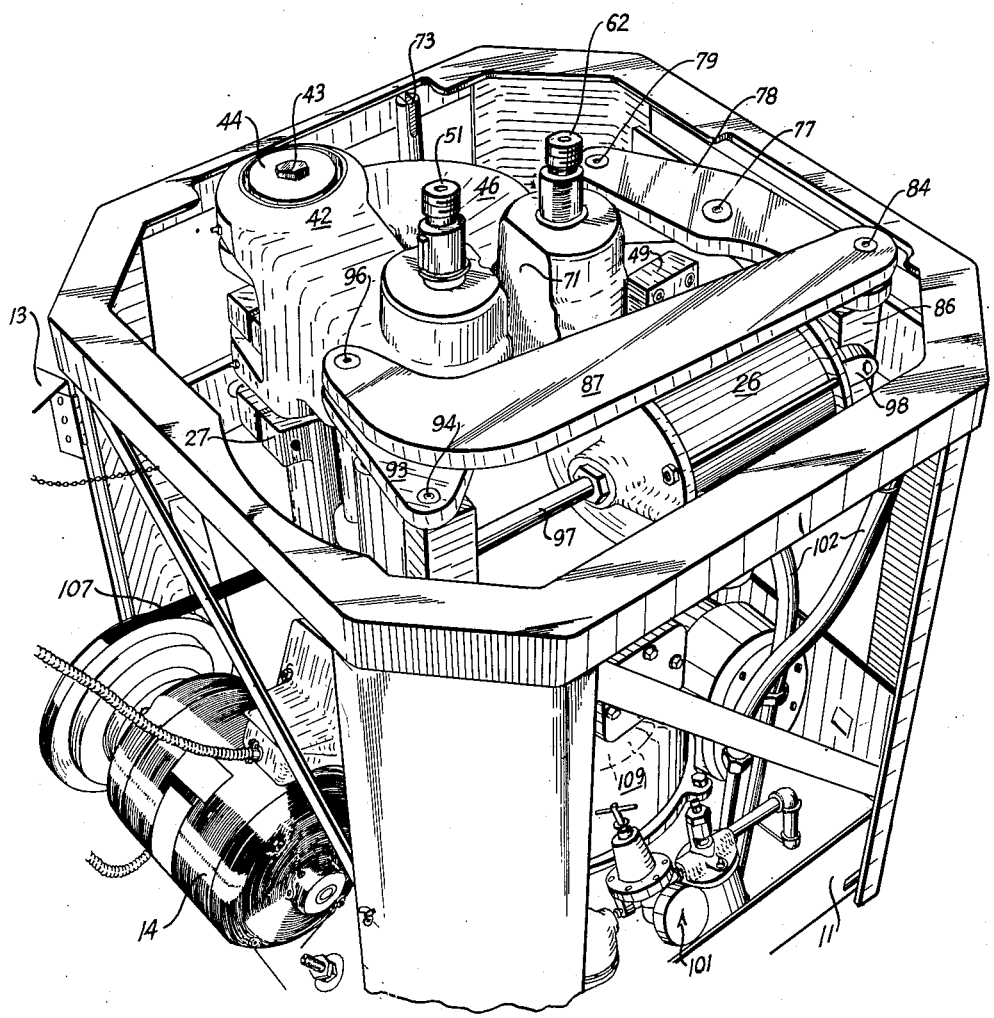
FIG.-3
INVENTOR.
Russell A. West
BY 
ATTORNEY

Nov. 18, 1952     R. A. WEST     2,618,309
MACHINE FOR TRIMMING STAMPINGS AND THE LIKE

Filed July 8, 1949     7 Sheets-Sheet 4

*INVENTOR.*
Russell A. West
BY

ATTORNEY

Nov. 18, 1952 R. A. WEST 2,618,309
MACHINE FOR TRIMMING STAMPINGS AND THE LIKE
Filed July 8, 1949 7 Sheets-Sheet 5
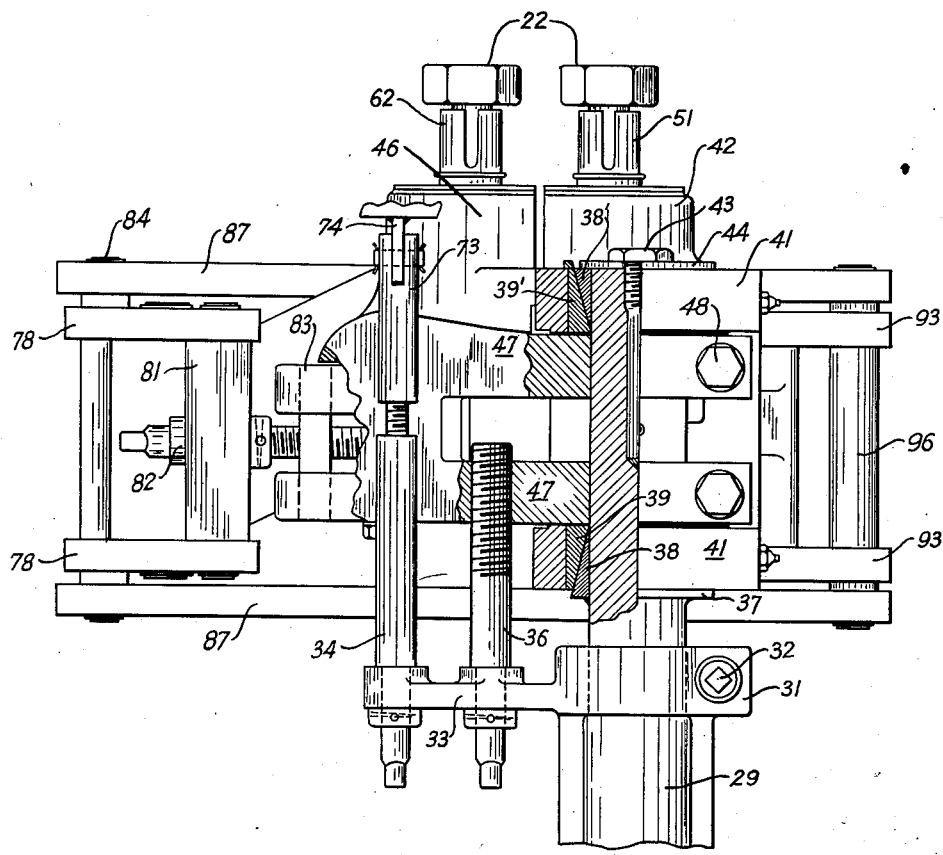
FIG.- 5
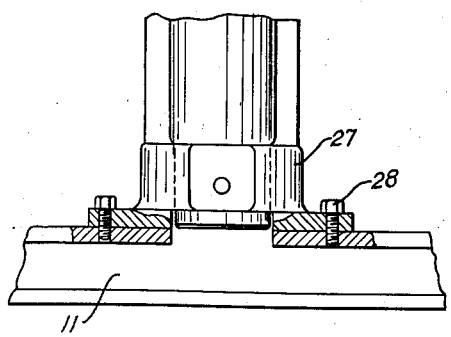
INVENTOR.
Russell A. West
BY
ATTORNEY Nov. 18, 1952     R. A. WEST     2,618,309
MACHINE FOR TRIMMING STAMPINGS AND THE LIKE
Filed July 8, 1949     7 Sheets-Sheet 6
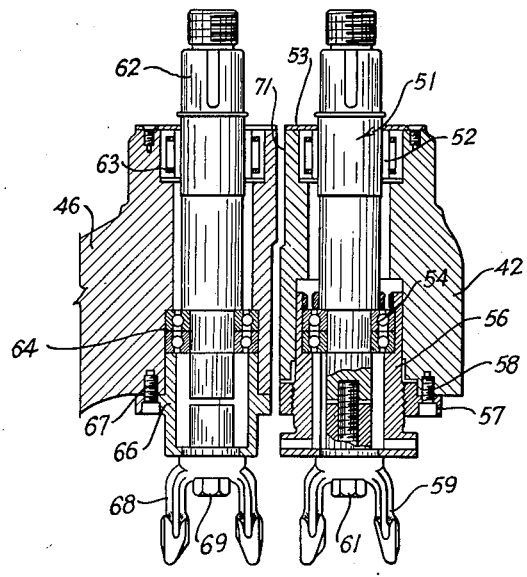
FIG.-6
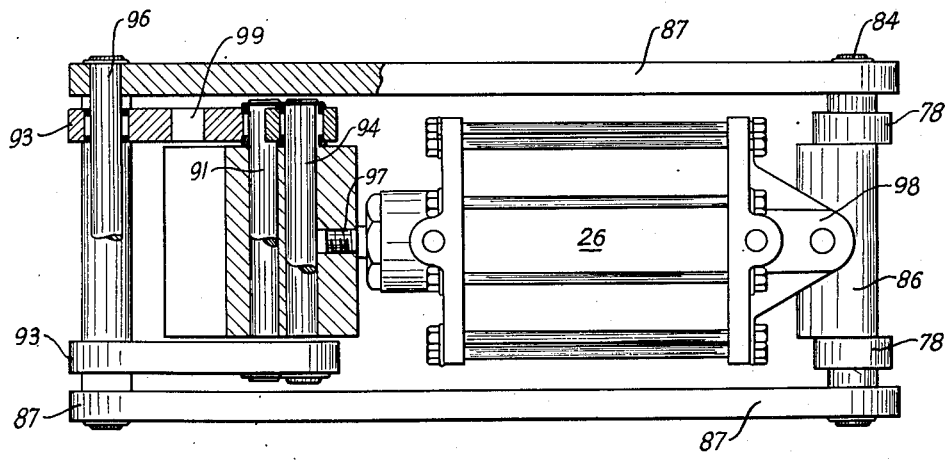
FIG.-7
INVENTOR.
Russell A. West
BY
ATTORNEY Nov. 18, 1952  R. A. WEST  2,618,309
MACHINE FOR TRIMMING STAMPINGS AND THE LIKE
Filed July 8, 1949  7 Sheets-Sheet 7
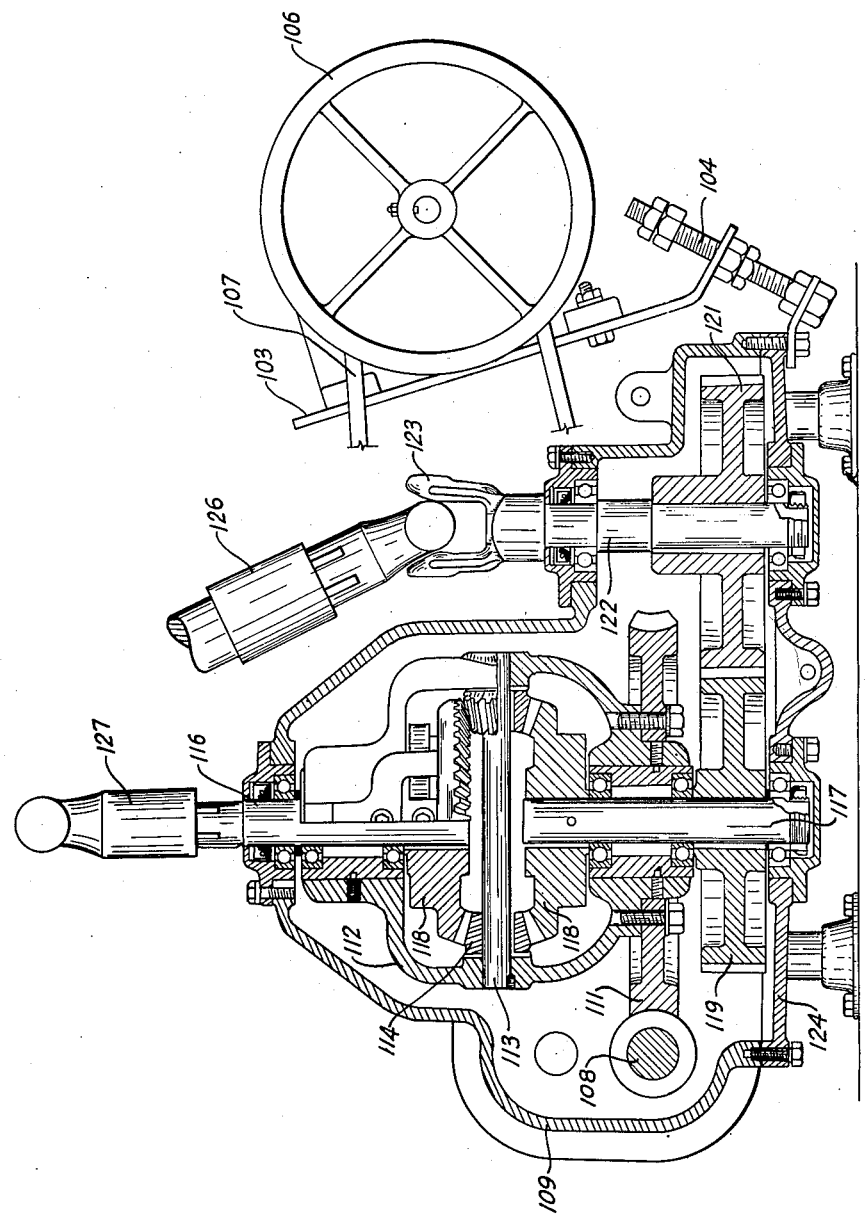
FIG.-8
INVENTOR.
Russell A. West
BY
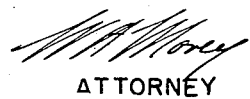
ATTORNEY Patented Nov. 18, 1952

2,618,309

UNITED STATES PATENT OFFICE 2,618,309

MACHINE FOR TRIMMING STAMPINGS AND THE LIKE

Russell A. West, Homewood, Ill., assignor to Whiting Corporation, Harvey, Ill., a corporation of Illinois Application July 8, 1949, Serial No. 103,711

7 Claims. (Cl. 153—2)

My invention has to do with a machine for performing operations such as trimming, cutting, forming, and beading on metal stampings, and the like.

There are several types of machines currently available for performing operations generally similar to those performed by my invention; and while these have given generally satisfactory service when utilized for the purpose for which they were designed, they are subject to certain objectionable shortcomings. For example, many of these prior art machines are relatively inflexible as to the type of work for which they may be conveniently employed, and are difficult to adjust when changing from an operation on one part to an operation on another. They are furthermore relatively large, bulky, complex, and costly, and are not in general adapted to relieve operator fatigue or develop a satisfactory speed of operation.

An object of my invention is to overcome these and other similar defects in prior art devices through the provision of a sturdy, compact, and relatively inexpensive machine of the type described, which is capable of rapid and simple adjustment to receive and process a diversity of shapes, which incorporates improved means for moving, driving, and adjusting the spindles, and which is highly convenient to use both with respect to speed and ease of operation, and with respect to maintenance.

Briefly, my machine includes a pair of vertical parallel spindles journaled in the ends of horizontal arms which are supported by a vertical post secured to a frame. One of the arms is fixed, the other being pivoted to the post for movement toward and away from the arm. This movement is accomplished by an air cylinder, or the like, which is connected selectively to the movable arm, either directly or through a toggle, the change from one type to another being very simply accomplished by the movement of a single pin.

The spindles carried by the arms both project upwardly through a table which may be tilted by the movement of a single screw or jack. A single screw is also provided on the frame for elevating both arms and their supporting post simultaneously with respect to the table, or by movement of another threaded member, one spindle may be elevated with respect to the other. Another screw is provided to vary the minimum distance between the spindles. In conjunction with these various features, I have incorporated a novel bearing arrangement for the support of the arms on the post, which is easily adjustable to compensate for wear, as well as other mechanical arrangements, such as a simplified differential spindle driving mechanism hereinafter described in detail.

The various novel features of my machine, as well as additional objects and advantages are disclosed at greater length in the following portion of my specification and in the appended drawings in which:

Fig. 3 is a perspective view of my machine with the covers removed;

Fig. 5 is a partial elevation of a portion of my device illustrating the disposition of the arms upon the support and taken along the line 5—5 of Fig. 2;

Fig. 6 is a partial vertical section through the spindles of my machine taken along the line 6—6 of Fig. 2;

Fig. 7 is a partial elevation of another portion of my machine taken along the irregular line 7—7 of Fig. 2;

Fig. 8 is a vertical section taken along an irregular plane through my drive mechanism;

Figure 1:
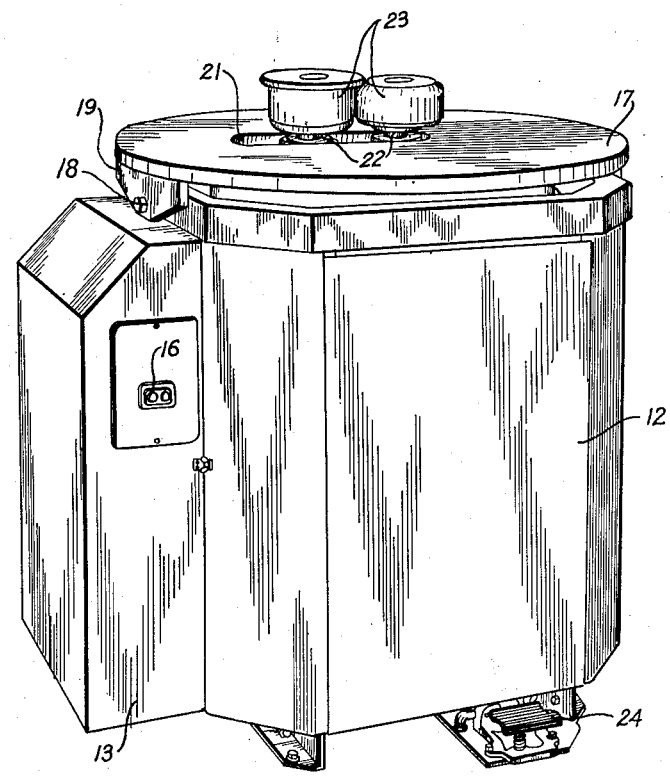
Fig. 1 is a general perspective view of my machine with the covers in place.

Referring to Figs. 1 and 3, my machine includes a frame, generally designated 11, approximately rectangular in form and extending upwardly from the floor approximately to waist height. The corners of the frame are preferably beveled and may be enclosed by covers 12 extending around three sides of the machine. A housing 13 encloses the fourth side and conceals a motor 14 connected to a switch 16 mounted on the external surface of the housing 13. A table 17 of heavy metal is mounted on top of the frame 11 and is secured thereto by bolts 18, or the like, extending through depending flanges 19 secured to the table 17.

Near the center of the table is an elongated opening, indicated at 21, through which spindles, generally designated 22, project. Tools, indicated at 23, may be suitably secured to the spindles, which are driven by the motor 14 and which may be moved towards and away from each other by operation of a foot valve or pedal 24, which communicates with an air cylinder 26 within the covers 12.

The axis of the table 17 should be generally parallel to a plane through the axis of the spindles 22, and in at least one position of the spindles, as they approach their closed position, should lie within such plane.

A split bracket 27 is secured in a generally vertical position to the frame 11 by bolts 28 near a side of the machine and is bored to receive a cylindrical post or support 29. At the upper end of the bracket 27 I provide a laterally extending split ear 31 through which a bolt 32 extends for clamping the bracket 27 securely about the post 29. A second laterally extending ear 33 is provided with a pair of spaced openings in which a table tilting screw 34 and a vertical adjustment screw 36 are journaled. A radially extending flange 37 is secured to the post 29 above the bracket 27 and supports a bearing sleeve 38 having a cylindrical bore and a frusto-conical external surface. A bearing sleeve 39 having a frusto-conical bore and a cylindrical external surface mates with bearing sleeve 38 and is mounted in the lower of a pair of spaced ears 41 formed integrally with a movable arm 42. The upper ear 41 is provided with a similar pair of bearing sleeves 38' and 39' and is bored to receive an axially disposed bolt 43. A washer 44 is interposed between the head of the bolt 43 and the top of the post 29, and is of such dimension as to engage the exposed surface of the bearing sleeve 38'. Thus it will be seen that as the bolt 43 is tightened, the bearing sleeves 38, 38' will be drawn towards each other and into smooth engagement with the sleeves 39, 39'.

A fixed arm 46 is provided with a pair of spaced laterally projecting split ears 47 having cylindrical openings formed therein adapted to receive the post 29. The ears 47 are spaced to fit between the ears 41 and are provided with bolts 48 by means of which the arm 46 may be securely clamped to the post 29. A reinforcing member 49 is secured at one end to the fixed arm 46 and slidably abuts the frame 11 at its other end, thus insuring that the arm 46 will remain in position during operation. The spindles 22 extend upwardly through the ends of the arms 42 and 46. The movable arm 42 supports a vertically adjustable spindle 51 which includes a cylindrical surface adapted to move vertically in a bearing 52 fixed in the upper portion of the arm 42 and covered by a plate 53. A lower bearing 54 is fixed to the spindle 51 and is supported by a collar 56 having external threads engaging a washer 57 which is in turn secured to the under surface of the arm 42 by bolts 58. A universal joint 59 is secured to the lower end of the spindle 51, as by a bolt 61.

The fixed arm 46 supports a rotatable spindle 62 journaled in a fixed upper bearing 63 and a lower bearing 64, the latter engaging the body of the arm 46 and being retained in position by a collar 66 bearing against the lower face of the bearing 62 and secured to the arm 46 by bolts 67. A universal joint 68 may be secured to the spindle 62 by a bolt 69. The upper portions of the spindles 51 and 62 are threaded and provided with keyways to receive the tools 23, and the adjacent faces of the arms 42 and 46 are flattened, as indicated at 71, to permit movement of the spindle centers into close proximity.

The lower portion of the ear 47 is provided with a threaded opening which receives the threaded end of the vertical adjusting screw 36 and from the preceding description it may be seen that rotation of the screw 36 will move the entire arm assembly and spindles together with the post 29 upwardly or downwardly with respect to the frame 11 and the table 17. The table-tilting screw 34 engages a threaded collar 73 which is pivoted at its upper end to a depending lug 74 secured to the under side of the table 17 in such manner that as the screw 34 raises or lowers the collar 73 the table 17 will be tilted about an axis extending through the bolts 18. The spindle 51 in the movable arm 42 may be raised or lowered with respect to the spindle 62 in the fixed arm 46 by movement of the threaded collar 56, thus providing a wide range of adjustments and permitting the utilization of my machine on a great diversity of objects.

The fixed arm 46 is provided with a laterally extending member 76 formed integrally with the arm 46 and includes a vertical opening in which a pivot pin 77 is mounted. On the pivot pin 77 I provide upper and lower lever arms 78 on either side of the member 76. At one end the lever arms 78 are provided with aligned openings in which a pivot pin 79 is mounted. A block 81 is journaled on the pin 79 and rotatably supports a horizontal adjusting screw 82. The threaded portion of the screw 82 engages a transversely extending threaded opening formed in a pivot pin 83 journaled in the body of the fixed arm 46, the latter having a cavity formed therein to receive the projecting end of the screw 82 and to permit rotation thereof about the axis of the pin 83.

The other end of the lever 78 is also provided with vertically aligned openings in which a pivot pin 84 is mounted. A block 86 is journaled to the pin 84 between the upper and lower lever 78. Upper and lower arms 87 are journaled to the pin 84 and extend in a direction generally transverse to the arms 42 and 46. The movable arm 42 is provided with a laterally extending leg 88 having a generally vertical opening 89 formed therein to receive a pivot pin 91. A second opening 92 spaced from the opening 89 is also formed in the leg 88. A pair of identical bell crank levers 93 are journaled to the pin 91 above and below leg 88, the pin 91 being generally at the apex of the levers 93 and between a pin 94 extending through both of the bell crank levers near one end and a pin 96 also extending through both of the levers 93 near the other end. The arms 87 are provided with suitable openings to receive the pin 96 thereby linking them to the bell crank lever 93. The pin 94 is pivotally secured to a piston rod 97, which is in turn secured to a piston disposed within the cylinder 26.

The cylinder 26 may be conveniently disposed between the upper and lower arms 87 and is provided with spaced lugs 98 by means of which the piston 96 may be pivotally secured to the block 86. The bell crank levers 93 are provided with aligned openings 99 adapted upon movement of the bell crank lever about the pin 91 for registry with the opening 92 in the leg 88. When so aligned, the pin 96 may be removed and placed in the openings 99 and 92, thus linking the piston rod 97 directly to the leg 88 and the movable arm 42. Air from a suitable supply is connected to the foot pedal valve 24, which communicates with an air regulator and filter unit 101, which is in turn connected by hoses 102 with the ends of the cylinder 26. The foot pedal 24 is arranged in such manner as to normally permit air under pressure to enter only one side of the cylinder 26, but as the pedal 24 is depressed, air is exhausted from that side of the cylinder 26 and introduced into the opposite end, thus reciprocating the piston rod 97.

If it be assumed that the pin 96 is in the position shown in Fig. 3, it will be apparent that as the rod 97 is drawn into the cylinder 26, the bell crank levers 93 will be rotated about the pin 91, allowing the arms 87 to move inwardly and thus forcing the arms 42 and 46 towards each other. This movement will continue until the piston rod has traveled its maximum stroke, or until the movable arm 42 otherwise encounters a positive stop.

Figure 2:
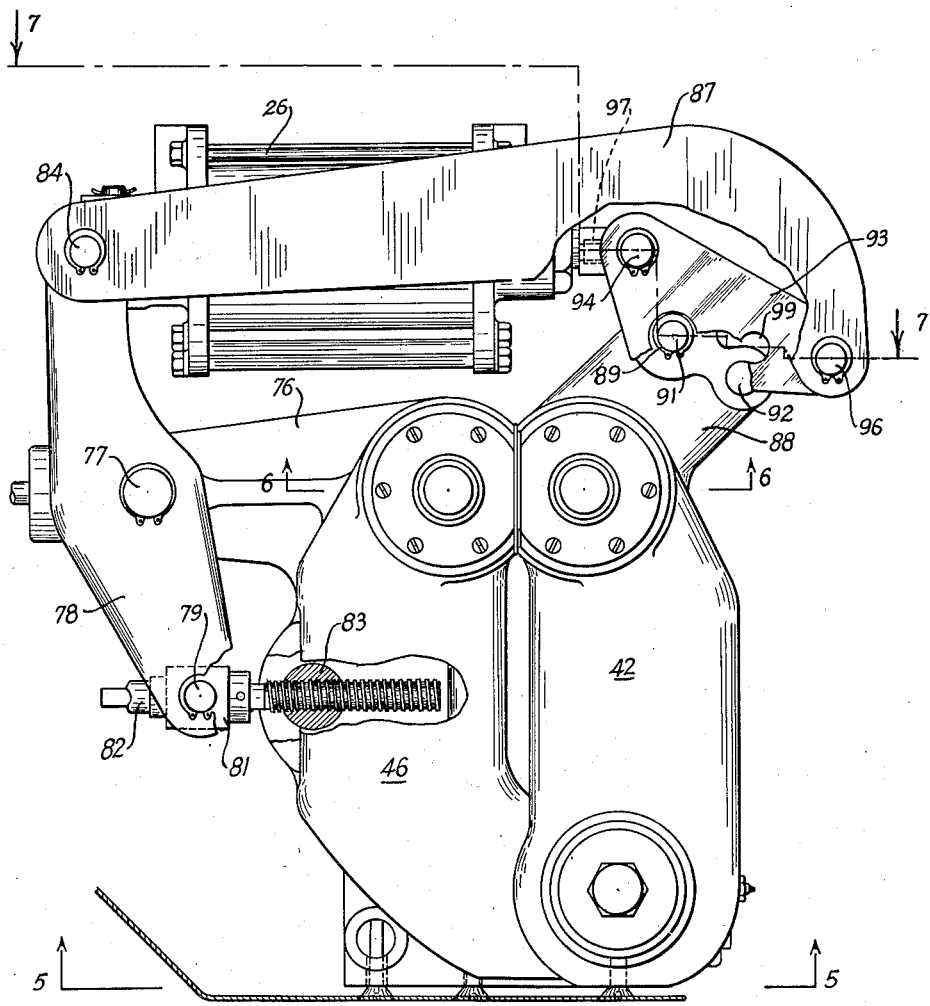
Fig. 2 is a partially broken away partial plan view of my machine.
Figure 4:
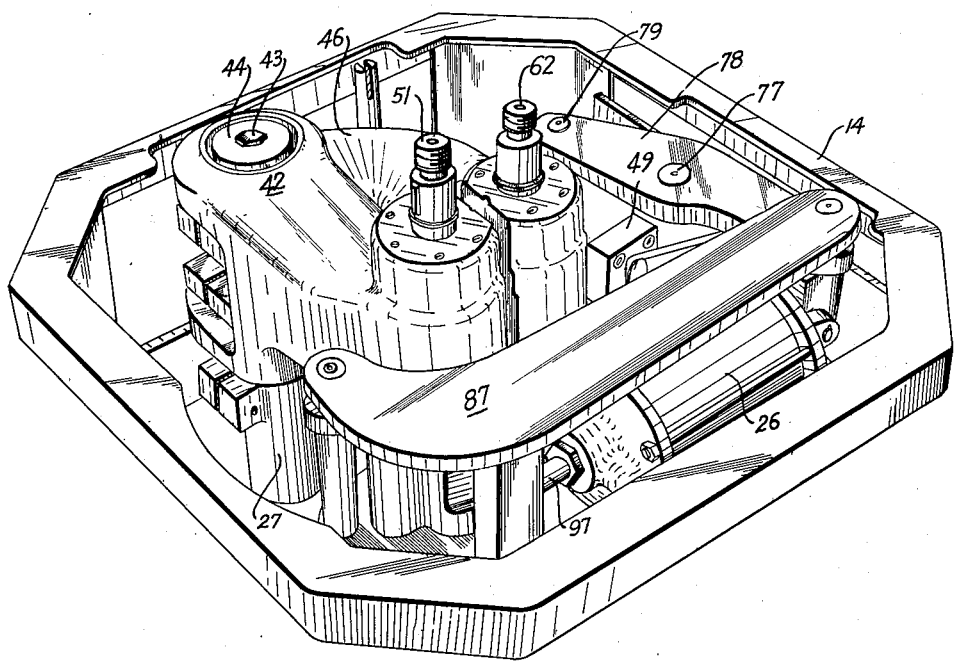
Fig. 4 is a partial perspective view of my machine similar to Fig. 3, but showing the arms in closed position.

The distance between the spindles 51 and 62, when the arms 42 and 46 are in their closed position, is regulated by a movement of the screw 82, it being apparent that as the screw 82 forces one end of the lever arm 78 outwardly, the opposite end, together with the pin 84, will be moved inwardly, thus increasing the distance between the spindles. If it is desired to have the cylinder 26 act directly upon the movable arm 42, it is necessary only to transfer the pin 96 from the position indicated in Fig. 2 to its alternative position wherein it extends through the openings 92 and 99. When in this position, the arms 87 are inoperative and the bell crank levers 93 cannot pivot about the pin 91. Movement of the piston rod 97 therefore moves the arm 42 directly. With the pin 96 shown in the position indicated in Fig. 2, it will be seen that the bell crank levers 93 will pivot about the pin 96 and the pin 91 as the piston rod 97 moves outwardly or to the right as shown in Fig. 2. This forces the arm 42 away from the fixed arm 46 and separates the spindles by a corresponding distance.

The motor 14 may be secured to a suitable conventional mounting, such as a plate 103 pivoted to the frame 11 at one end, and supported at its opposite end by threaded member 104 engaging a fixed member at one end and movable to pivot the plate 103 about its axis. A drive sheave 106 is secured to the motor shaft and drives a belt 107 trained over a second sheave (not shown), which in turn drives a horizontally disposed worm 108 mounted in a differential housing 109. A worm wheel 111 is secured to a differential carrier 112 of conventional design, which includes a cross shaft 113 upon which spider gears 114 are mounted. An upper output shaft 116 and a lower output shaft 117 are coaxial and vertically disposed, the former being journaled in the housing 109. Both of the shafts 116 and 117 are journaled in the carrier 112, extending inwardly therethrough into engagement with bevel gears 118, which mesh with the spider gears 114. A spur gear 119 is secured to the shaft 117 within the housing 109, but externally to and below the carrier 112 and meshes with a second spur gear 121 secured to a shaft 122. Shaft 122 is journaled in the housing 109 and extends outwardly and upwardly therefrom parallel to shaft 116 into engagement with a universal joint 123.

The housing 109 includes a removable lower cover 124 in which the shafts 117 and 122 are journaled, and which can be removed when required for replacement of the gears 119 and 121. This permits selective variations of the speed of the shaft 122 with respect to the speed of the shaft 116.

The universal joint 123 is coupled to a splined shaft 126, which is in turn secured to the universal joint 59 on the spindle 51. The shaft 116 may be splined and slidably engage a shaft 127 which is coupled to the universal joint 68 of the spindle 62. The universal joint 68 is in some instances unnecessary, since the differential housing 109 is placed on end as shown in Fig. 8 with a shaft 116 in alignment with the spindle 62. It is usually advisable to employ a single universal joint on the shaft 116 to compensate for minor errors in alignment of the two shafts, but connection is essentially direct as contrasted to the connection between the shaft 122 and the spindle 51, which requires a pair of universal joints and a splined shaft.

Figure 9:
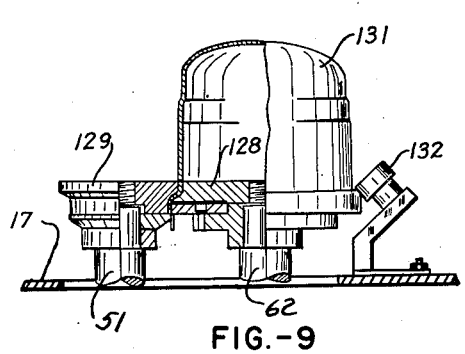
Fig. 9 is a partial diagrammatic elevation of the spindles of my machine illustrating the application of the work to tools mounted on the spindles.
Figure 10:
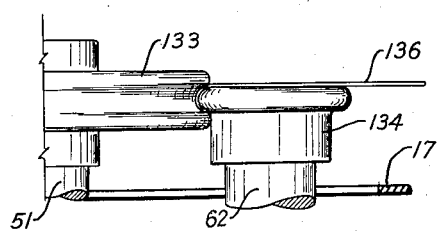
Fig. 10 is similar to Fig. 9 illustrating a method of performing another forming operation.

In Figs. 9 and 10, I will have illustrated examples of the many diverse operations which can be accomplished by my machine. Fig. 9 illustrates a condition where a suitable tool 128 has been secured to the fixed spindle 62 and a complementary tool 129 to the movable spindle 51. An object 131 upon which work is to be performed is placed on the tool 128, the spindle 51 being moved away from the spindle 62 by operation of the foot pedal 24 for this purpose. The motor 14 is actuated by the switch 16, and is ordinarily permitted to remain in operation the full time the machine is in use. When the object 131 is in position on the tool 128, the foot pedal 24 is operated to bring the tool 129 and the tool 128 together. As indicated in Fig. 9, the tools 128 and 129 operating together to form a flange on the edge of the object 131 shear the excess metal from the lip, thus leaving a smooth flanged surface. If desired, a roller 132, or similar tool or jig, can be secured to the table 17 for assisting the tool 129 in its operation, and to assure proper positioning of the object 131.

Fig. 10 illustrates an arrangement wherein the tool 133 is secured to the movable spindle 51 and has a peripheral groove adapted to receive corresponding tool 134 on spindle 62. The object 136 is placed on the tool 134 and the spindle 51 moved to the right as of Fig. 10, bringing the tools 134 and 133 together. Since both of the tools are rotating while they are held together under pressure, the edge of the object 136 will be turned under between the edges of the tools, thus forming a flange.

From the foregoing, it may be seen that in the ordinary course of industrial usage, a machine adapted to trim, form, and bead and otherwise operate on stampings must be highly flexible and capable of rapid, accurate adjustments if it is to have maximum utility. My machine fulfills these requirements to a remarkable degree, since essentially any one of the several adjustments possibly required may be made by movement of a single screw. There are no overhanging parts to interfere with the operator's hand and possibly cause injury or which make more difficult the application of work to the tools or utilization of suitable jigs and fixtures on the work table.

I have chosen to illustrate the application of an air cylinder to my machine since this is ordinarily preferable in most establishments. It is obvious, however, that an electric motor operating on a threaded shaft, a hydraulic cylinder, or other similar means may be employed to reciprocate the piston rod, which opens and closes the arms. Since I may vary the linkage between the source of power, such as an air cylinder, and the movable arm, as by using either a toggle type of connection or a direct connection, my machine is adaptable for work upon both light and heavy metal stampings. Furthermore, this type of linkage permits incorporation of the mechanism in a smaller housing, which conserves floor space as compared to prior art models. The simplification of the drive mechanism has eliminated several moving parts, which not only reduces the cost of the machine, but also simplifies the problem of maintenance.

The foregoing detailed description is to be understood as representing a preferred embodiment of my invention. I do not, however, limit myself to the specific details herein disclosed except insofar as described in the appended claims.

I claim.

1. A trimming and forming machine for metal stampings and the like comprising a frame, a support on the frame, a first arm fixed to the support, a second arm pivoted to the support, parallel upwardly extending vertical spindles journaled in the arms, means for driving the spindles, a bell crank lever pivoted to the second arm, a member pivoted at one end of the bell crank lever and at its opposite end to a second member fixed with respect to the first arm, a rod pivoted on the other end of the bell crank, and means for reciprocating the rod for opening and closing said arms.

2. A trimming and forming machine for metal stampings and the like comprising a frame, a support on the frame, a first arm fixed to the support, a second arm pivoted to the support, parallel upwardly extending spindles journaled in the arms, means for driving the spindles, a lever pivoted to the first arm, a threaded member connecting one end of the lever with the first arm, a bell crank pivoted to the second arm, a member pivotally connected at one end to an end of the bell crank and at its opposite end to an end of said lever, a rod pivoted to the other end of the bell crank lever, and power means for reciprocating the rod.

3. In a machine of the type described, a frame, an upright support on the frame, a fixed arm on the support, an upwardly extending first spindle journaled in said arm, a movable arm on the support, an upwardly extending second spindle in the movable arm parallel to the first spindle, a bell crank pivoted intermediate its ends to the movable arm, a piston rod pivoted to one end of the bell crank, an arm pivoted to the other end of the crank, a member fixed with respect to the frame, the opposite end of said last named arm being pivotally secured to said member, and means for locking the bell crank against rotation.

4. In a machine of the type described, a frame, a support on the frame, a fixed arm on the support, a movable arm pivotally secured to the support, a lever arm pivotally secured to the fixed arm, a threaded member interconnecting the fixed arm and the lever arm, a first arm pivoted at one end to the lever arm, a bell crank pivoted intermediate its ends to the movable arm, said first arm being pivotally secured at its opposite end to an end of the bell crank, a reciprocal rod pivoted to the other end of the crank, and means for reciprocating the rod.

5. A trimming and forming machine for metal stampings and the like comprising a box frame having upright sides and a bottom member, an upright guide on the bottom member spaced inwardly from the sides, a post reciprocable in the guide, a pair of laterally extending arms on the post, the first of said arms being pivotally supported by the post and the second of the arms being fixed thereto, parallel upwardly extending spindles journaled in the arms, a generally horizontal table on the sides defining an opening for said spindles, lever means on the arms for forcing the arms together, jack means fixed with respect to the frame for forcing the post and arms upwardly in the guide and means for driving the spindles, said spindles being the sole members extending upwardly beyond the surface of the table.

6. A trimming and forming machine for metal stampings and the like comprising a frame, a support on the frame, first and second arms on the support, one of said arms being pivoted to the support, parallel upwardly extending spindles journaled in the arms, means for driving the spindles, a bell crank pivoted intermediate its ends to said second arm, a member pivotally secured at one end to an end of the bell crank and at its opposite end to a member fixed with respect to the first arm and means pivotally secured to the other end of the bell crank for rocking said crank and thereby opening and closing said arms.

7. A trimming and forming machine for metal stampings and the like comprising a frame, a generally horizontal table pivoted to the frame for movement about a centrally disposed generally horizontal axis and defining an opening along said axis, means for tilting the table, an upright support below the table reciprocable along the frame, a pair of laterally extending arms along the support, at least one of the arms being pivoted thereto, means movable with the arms for forcing the arms together, upright tool spindles journaled in the arms and projecting upwardly through said opening, one of the said spindles having a journal slidable vertically in the arm and means for locking the slidable journal in position, means for driving the spindles and means for moving both of said arms and said support as a unit with respect to the table.

RUSSELL A. WEST.

REFERENCES CITED

The following references are of record in the file of this patent:

UNITED STATES PATENTS

| Number | Name | Date |
|---|---|---|
| 504,289 | Vanderbeek | Aug. 29, 1893 |
| 726,248 | Boyer | Apr. 28, 1903 |
| 1,141,201 | Munson | June 1, 1915 |
| 1,386,979 | Wickersham | Aug. 9, 1921 |
| 1,420,591 | Thomes | June 20, 1922 |
| 1,534,999 | Watson | Apr. 21, 1925 |
| 1,582,973 | Dodd | May 4, 1926 |
| 1,750,784 | Petersen | Mar. 18, 1930 |
| 1,774,155 | Platou | Aug. 26, 1930 |
| 1,799,229 | Hanna | Apr. 7, 1931 |
| 1,820,436 | Carlson | Aug. 25, 1931 |
| 1,850,958 | Horvath | Mar. 22, 1932 |
| 2,005,100 | Merrigan | June 18, 1935 |
| 2,014,596 | Smith | Sept. 17, 1935 |
| 2,058,680 | Gorsline | Oct. 27, 1936 |
| 2,088,110 | Lamb | July 27, 1937 |
| 2,251,810 | Smith | Aug. 5, 1941 |
| 2,312,225 | Wilkinson | Feb. 23, 1943 |
| 2,352,816 | Weightman | July 4, 1944 |
| 2,404,921 | Oxsen | July 30, 1946 |
| 2,490,880 | Olson | Dec. 13, 1949 |

FOREIGN PATENTS

| Number | Country | Date |
|---|---|---|
| 13,131 | Great Britain | June 1, 1911 |